United States Patent
Deng et al.

(10) Patent No.: US 11,411,506 B2
(45) Date of Patent: Aug. 9, 2022

(54) CONTROL CIRCUIT AND SWITCHING CONVERTER

(71) Applicant: Silergy Semiconductor Technology (Hangzhou) LTD, Hangzhou (CN)

(72) Inventors: Jian Deng, Hangzhou (CN); Jin Jin, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 5 days.

(21) Appl. No.: 17/083,513

(22) Filed: Oct. 29, 2020

(65) Prior Publication Data

US 2021/0143743 A1    May 13, 2021

(30) Foreign Application Priority Data

Nov. 8, 2019   (CN) .......................... 201911104821.9

(51) Int. Cl.
*H02M 1/08*    (2006.01)
*H02M 3/335*   (2006.01)
*H02M 1/00*    (2006.01)

(52) U.S. Cl.
CPC ....... *H02M 3/33592* (2013.01); *H02M 1/083* (2013.01); *H02M 1/0058* (2021.05)

(58) Field of Classification Search
CPC ......... H02M 3/33592; H02M 3/33576; H02M 1/0083; H02M 1/0058; H02M 1/0048; H02M 1/0054
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 8,477,514 B2* | 7/2013 | Artusi ................. H02M 1/4225 363/21.01 |
| 9,325,254 B2 | 4/2016 | Deng et al. |
| 9,331,588 B2 | 5/2016 | Chen |
| 9,488,680 B2 | 11/2016 | Xu |
| 9,899,931 B1* | 2/2018 | Chang ............... H02M 3/33592 |
| 2014/0078789 A1 | 3/2014 | Li et al. |
| 2014/0239934 A1 | 8/2014 | Zhang |
| 2015/0160270 A1 | 6/2015 | Shi et al. |
| 2015/0280578 A1 | 10/2015 | Huang et al. |
| 2018/0115252 A1* | 4/2018 | Chang ..................... H02M 1/08 |

* cited by examiner

*Primary Examiner* — Adolf D Berhane

(57) ABSTRACT

A control circuit for a switching converter having a main power switch and a freewheeling circuit, can be configured to: control the freewheeling circuit to be turned on in a first time interval after the main power switch is turned off; control the freewheeling circuit to be turned on in a second time interval after the first time interval, in order to reduce turn-on loss of the main power switch; and where the first time interval and the second time interval do not overlap each other in a switching cycle.

19 Claims, 8 Drawing Sheets

CONTROL CIRCUIT AND SWITCHING CONVERTER

RELATED APPLICATIONS

This application claims the benefit of Chinese Patent Application No. 201911104821.9, filed on Nov. 8, 2019, which is incorporated herein by reference in its entirety.

FIELD OF THE INVENTION

The present invention generally relates to the field of power electronics, and more particularly to switching converters and control circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching converter can store energy in a magnetic component when a main power switch is on. The stored energy may then be transmitted to the load when the main power switch is off. In addition, the magnetic component in the switching converter can resonate with a junction capacitor of the main power switch, which may result in a turn-on loss when the main power switch is turned on again, as well as a lower conversion efficiency. In order to reduce the turn-on loss, a quasi-resonance approach can be used to control the main power switch to be turned on. That is, the main power switch can be turned on when the drain-source voltage of the main power switch resonates to the minimum, thereby realizing the zero-voltage-switching. However, it can be difficult to realize such zero-voltage-switching when the input voltage of the switching converter changes. In such a case, the turn-on loss increases and the conversion efficiency is reduced.

In one embodiment, a control circuit for a switching converter including a main power switch and a freewheeling circuit, can be configured to: (i) control the freewheeling circuit to be turned on in a first time interval after the main power switch is turned off; (ii) control the freewheeling circuit to be turned on in a second time interval after the first time interval, in order to reduce turn-on loss of the main power switch; and (iii) where the first time interval and the second time interval do not overlap each other in a switching cycle.

Figure 1:
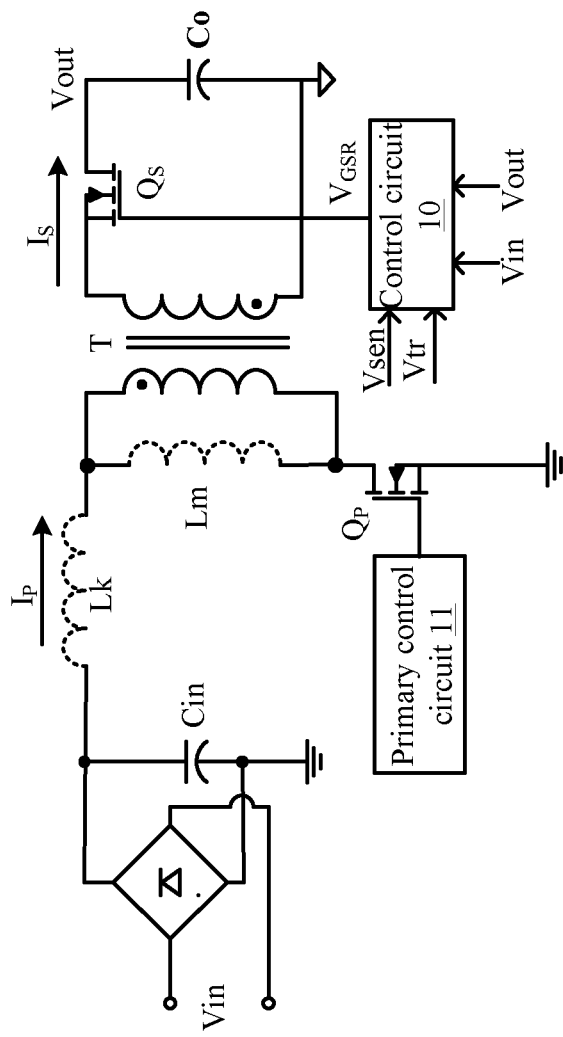
FIG. 1 is a schematic block diagram of a first example switching converter, in accordance with embodiments of the present invention.

Referring now to FIG. 1, shown is schematic block diagram of a first example switching converter, in accordance with embodiments of the present invention. In this particular example, the switching converter is flyback converter, and can include a rectifying bridge, a power stage circuit, control circuit 10, and primary control circuit 11. The rectifying bridge can receive and rectify AC input voltage Vin to generate a DC voltage. The power stage circuit can include transformer T, main power switch Qp connected in series with a primary winding of transformer T, a freewheeling circuit coupled in series with a second winding of transformer T, and output capacitor Co. Optionally, the freewheeling circuit can include freewheeling power switch Qs. Here, a first terminal (e.g., the non-dotted terminal) of the primary winding can connect with a first power terminal of main power switch Qp, a second terminal (e.g., the dotted terminal) of the primary winding can connect with the rectifying bridge to obtain the DC voltage, and a second power terminal of main power switch Qp can connect with the primary reference ground. A first terminal (e.g., the non-dotted terminal) of the secondary winding can connect with a first power terminal of freewheeling power switch Qs, and output capacitor Co can connect between a second power terminal of freewheeling power switch Qs and a second terminal (e.g., the dotted terminal) of the secondary winding. DC output voltage Vout may be generated across output capacitor Co.

In FIG. 1, the primary winding of transformer T can be equivalent to excitation inductance Lm and leakage inductance Lk connected in series, which are respectively shown in dotted lines. Control circuit 10 may generate control signal $V_{GSR}$ to control the on and off states of freewheeling power switch Qs. Primary control circuit 11 can control the on and off states of main power switch Qp. When main power switch Qp is on, primary current Ip may flow through the primary winding and increase as the on time increases, thereby controlling transformer T to store energy. When main power switch Qp is gradually turned off, primary current Ip may decrease to be zero, and then transformer T can release energy and provides energy for output capacitor Co and the load.

In particular embodiments, after main power switch Qp is turned off, control circuit 10 can control freewheeling power switch Qs to be turned on during a first time interval (e.g., T1). After the first time interval, freewheeling power switch Qs can be controlled to be on during a second time interval (e.g., T2), such that the drain-source voltage of main power switch Qp can be decreased to zero before main power switch Qp is turned on. In such a case, the first time and second time intervals do not overlap each other in one switching cycle. In addition, the length of the first time interval can be greater than that of the second time interval. During the second time interval, freewheeling power switch Qs may be turned on, and secondary current Is may be negative and gradually increase. After the second time interval, freewheeling power switch Qs can be turned off, and energy may be released through the primary winding of transformer T to accelerate the discharge of the junction capacitor of main power switch Qp, such that the drain-source voltage of main power switch Qp can be decreased to zero due to the resonance between the leakage inductor and the junction capacitor.

In particular embodiments, control circuit 10 can sample input voltage Vin and output voltage Vout. Moreover, control circuit 10 can adjust a length of the second time interval according to input voltage Vin and output voltage Vout, such that the drain-source voltage can be decreased to be zero before main power switch Qp is turned on. Further, the change of the length of the second time interval may have the same trend as that of the input voltage Vin of the switching converter, and may have an opposite trend with that of the output voltage Vout of the switching converter. It should be understood that control circuit 10 can obtain the information of input voltage Vin by sampling the voltage across the secondary winding, and other suitable circuitry can also be employed realize this functionality.

Control circuit 10 can receive track signal Vtr representing the time interval passed in the current switching cycle to control freewheeling power switch Qs to be turned on in the second time terminal. Here, the second time terminal may begin from a first moment that is used to define the starting point of the second time terminal after the current flowing through freewheeling power switch Qs drops to zero. Further, the second time terminal may end before the main power switch is turned on in the next switching cycle. In this particular example, the first moment can be a moment when a time interval passed in the current switching cycle reaches a threshold signal. Also, control circuit 10 can receive sample signal Vsen representing the drain-source voltage of freewheeling power switch Qs to further control freewheeling power switch Qs to be turned on at a valley of the drain-source voltage of freewheeling power switch Qs after the first moment, in order to reduce the turn-on loss of the freewheeling power switch Qs.

In particular embodiments, control circuit 10 can sample the voltage of the first terminal of the secondary winding as sample signal Vsen representing drain-source voltage of freewheeling power switch Qs. Alternatively, control circuit 10 may sample the voltage of the common terminal of freewheeling power switch Qs and output capacitor Co as sample signal Vsen, thereby controlling freewheeling power switch Qs to be on during the second time terminal when sample signal Vsen is at valley. Thus, the turn-on loss of freewheeling power switch Qs can be reduced. In particular embodiments, the switching converter may operate in the discontinuous current mode (DCM), and control circuit 10 can control freewheeling power switch Qs to be on during the second time terminal after the secondary current drops to zero. In addition, main power switch Qp and freewheeling power switch Qs can be controlled devices, such as bipolar junction transistors (BJTs) or field-effect transistors (FETs).

Within a switching cycle, the freewheeling circuit can be controlled to be on during the first time terminal after the main power switch is turned off. Further, the freewheeling circuit can be controlled to be on during the second time terminal after the first moment. For example, the second time terminal can be adjusted according to the input voltage and the output voltage of the switching converter. After the second time terminal, the junction capacitor of the main power switch may be discharged and then the drain-source voltage of the main power switch resonates to be zero before the main power switch is turned on to decrease the turn-on loss. In addition, the freewheeling circuit can be turned on at the valley of the drain-source voltage of the freewheeling power switch, which may also decrease the turn-on loss of the freewheeling circuit and improve the efficiency of the system.

Figure 2:
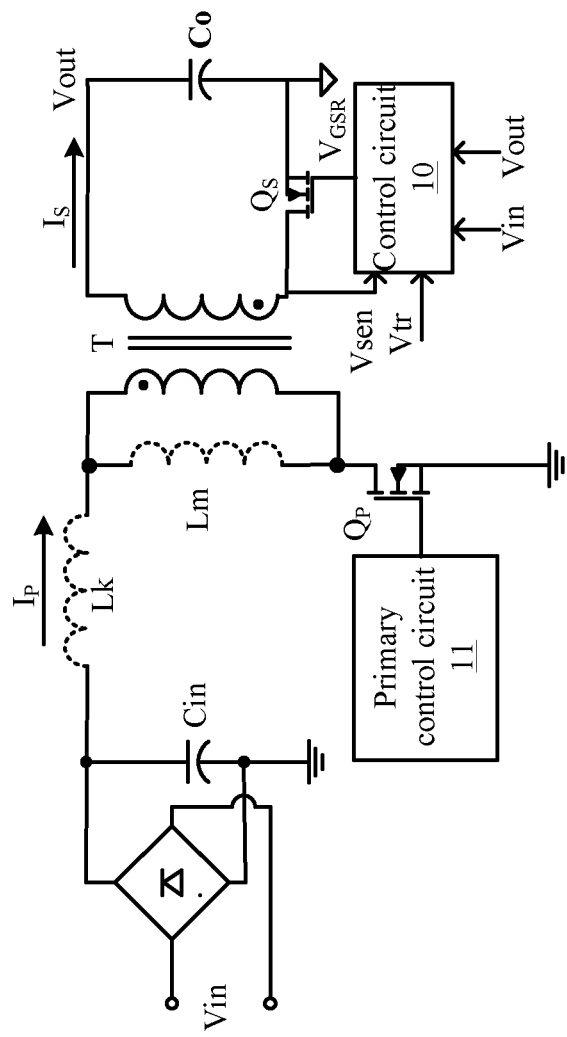
FIG. 2 is a schematic block diagram of a second example switching converter, in accordance with embodiments of the present invention.

Referring now to FIG. 2, shown is a schematic block diagram of a second example switching converter, in accordance with embodiments of the present invention. As is shown in FIG. 2, the switching converter can be a flyback switching converter that includes a rectifying bridge, a power stage circuit, control circuit 10, and primary control circuit 11. The power stage circuit, control circuit 10, primary control circuit 11, and the control method thereof for the second example switching converter may be substantially the same as the first example switching converter described above. However, in this example, freewheeling power switch Qs can connect between the second terminal of the secondary winding and the secondary ground. Moreover, control circuit 10 may obtain sample signal Vsen by sampling the voltage at the dotted terminal of the secondary winding. For example, the freewheeling circuit can include a main power switch and an auxiliary power switch coupled in parallel.

Figure 3:
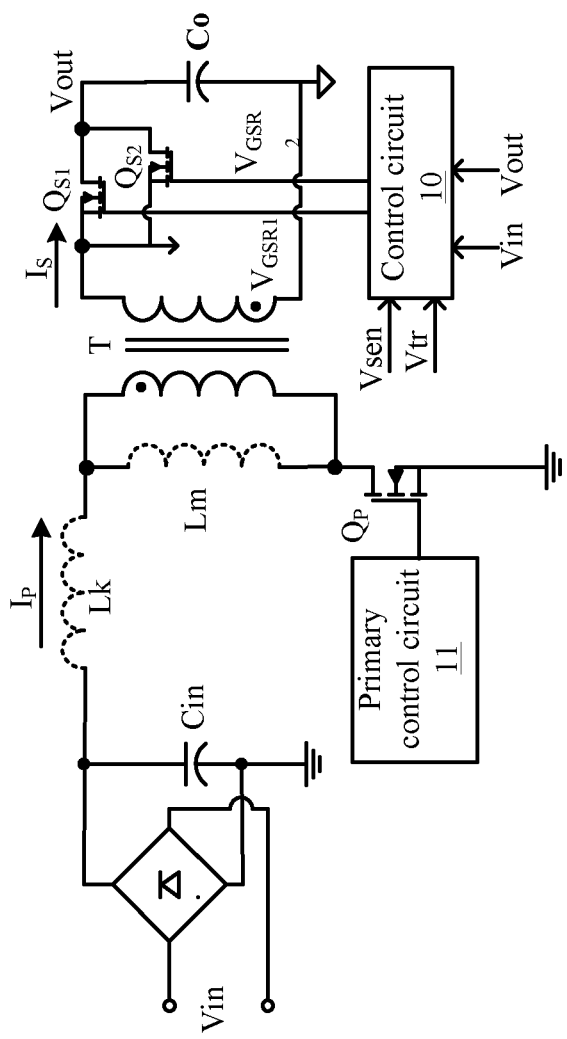
FIG. 3 is a schematic block diagram of a third example switching converter, in accordance with embodiments of the present invention.

Referring now to FIG. 3, shown is a schematic block diagram of a third example switching converter, in accordance with embodiments of the present invention. In this particular example, the switching converter can be a flyback switching converter that includes a rectifying bridge, a power stage circuit, control circuit 10, and primary control circuit 11. Similarly, the power stage circuit, control circuit 10, primary control circuit 11, and the control method thereof for the third example switching converter may be substantially the same as the first example switching converter. In this particular example, the freewheeling circuit can include freewheeling power switches Qs1 and Qs2 that are connected in parallel between the first terminal (e.g., non-dotted terminal) of the secondary winding and the first terminal of output capacitor Co. For example, control circuit 10 can sample the first terminal or the second terminal of freewheeling power switches Qs1 and Qs2, in order to obtain sample signal Vsen. It should be understood that freewheeling power switches Qs1 and Qs2 can connect in parallel between the second terminal of output capacitor Co (e.g., the secondary ground) and the second terminal of the secondary winding (e.g., dotted terminal), in order to realize the same functionality. In such a case, control circuit 10 can sample the voltage at the second terminal of the secondary winding to obtain sample signal Vsen.

In this example, control circuit 10 can generate freewheeling control signals $V_{GSR1}$ and $V_{GSR2}$. Further, control signal $V_{GSR1}$ can control the on and off states of freewheeling power switch Qs1, and freewheeling control signal $V_{GSR2}$ can control the on and off states of freewheeling power switch Qs2. After main power switch Qp is turned off, freewheeling power switch Qs1 can be turned on in the first time interval according to freewheeling control signal $V_{GSR1}$, and freewheeling power switch Qs2 can be turned on according to freewheeling control signal $V_{GSR2}$ in the first time interval. After the secondary current decreases to zero, freewheeling control signals $V_{GSR1}$ and $V_{GSR2}$ may be inactive, such that freewheeling power switches Qs1 and Qs2 are turned off. After the first time interval, control circuit 10 can control freewheeling control signal $V_{GSR2}$ to be active to turn on freewheeling power switch Qs2 during the second time interval according to track signal Vtr, such that the junction capacitor of the main power switch is discharged to realize zero-voltage-switching. In addition, control circuit 10 may also control freewheeling power switch Qs2 to be turned on at the valley of sample signal Vsen that represents the drain-source voltage of freewheeling power switch Qs2. Thus, the turn-on loss for main power switch Qp and freewheeling power switch Qs2 may be decreased, thereby improving the efficiency of the system.

In this example, the size of freewheeling power switch Qs1 may be different from that of freewheeling power switch Qs2. For example, the size of freewheeling power switch Qs2 may be less than that of freewheeling power switch Qs1, such that the negative current flowing through freewheeling power switch Qs2 can be better controlled and the circuit is simplified. During the first time interval, both freewheeling power switches Qs1 and Qs2 may remain on. During the second time interval, only freewheeling power switch Qs2 may be on, such that balance between turn-on loss and conduction loss of freewheeling power switches Qs1 and Qs2 can be achieved. In such a case, the power loss may be reduced and the temperature better controlled.

Figure 4:
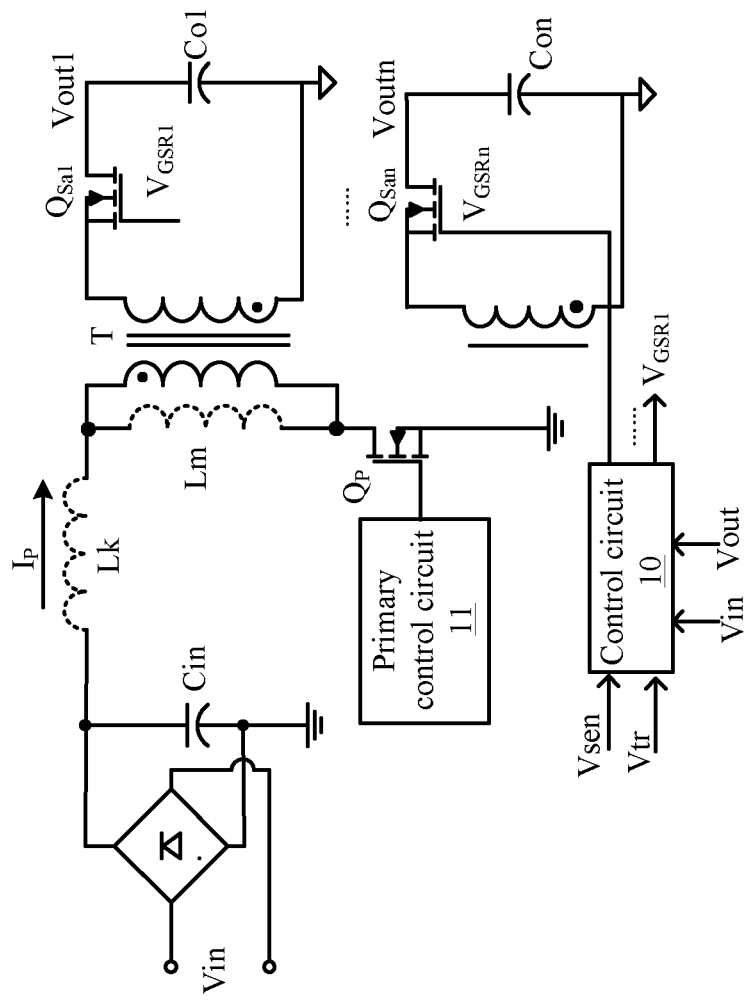
FIG. 4 is a schematic block diagram of a fourth example switching converter, in accordance with embodiments of the present invention.

Referring now to FIG. 4, shown is a schematic block diagram of a fourth example switching converter, in accordance with embodiments of the present invention. In this particular example, the switching converter is a flyback switching converter that includes a rectifying bridge, a power stage circuit, control circuit 10, and primary control circuit 11. The power stage circuit, control circuit 10, primary control circuit 11, and the control method thereof for the third example switching converter may be substantially the same as the first example switching converter. In this particular example, the switching converter can include N output branches (N≥1), thereby generating N output voltages (Vout1, . . . Voutn). For example, each output branch can be coupled to the primary winding through the secondary winding and can include a freewheeling power switch and an output capacitor connected in series. Taking the first output branch as an example, the first output branch can include output capacitor Co1 and freewheeling power switch Qsa1 connected in series, and the voltage across output capacitor Co1 can be output voltage Vout1. Similarly, the N-th output branch can include output capacitor Con and N-th freewheeling power switch Qsan connected in series, and the voltage across output capacitor Con can be N-th output voltage Voutn.

In particular embodiments, control circuit 10 can generate N freewheeling control signals to control the on and off states of N freewheeling power switches. After main power switch Qp is turned off, freewheeling power switch Qs1 to N-th freewheeling power switch Qsn may all be turned on in the first time interval according to respective freewheeling control signals $V_{GSR1}$ to $V_{GSRn}$. After the first time interval, freewheeling control signals $V_{GSR1}$ to $V_{GSRn}$ may be inactive. Afterwards, control circuit 10 can control N-th power switch Qsan to be turned on in the second time interval according to N-th freewheeling control signal $V_{GSRn}$, such that the junction capacitor of the main power switch can be discharged to zero before the main power switch is turned on. In addition, N-th freewheeling power switch Qsan can be controlled to be turned on at the valley of the drain-source voltage thereof and remain on in the second time interval. Thus, the turn-on loss for main freewheeling power switch Qp and N-th freewheeling power switch Qsn may be decreased. In addition, it should be understood that the switching converter in certain embodiments can alternatively be buck converter, boost converter, or any other suitable switching converter.

Figure 5:
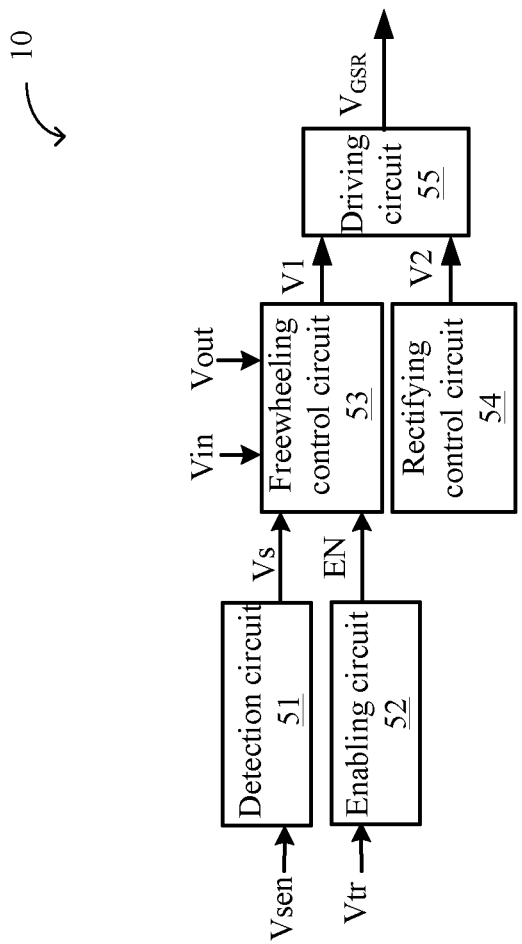
FIG. 5 is a schematic block diagram of a first example control circuit, in accordance with embodiments of the present invention.

Referring now to FIG. 5, shown is a schematic block diagram of a first example control circuit, in accordance with embodiments of the present invention. Control circuit 10 can include detection circuit 51 and enabling circuit 52. For example, detection circuit 51 can generate detection signal Vs representing a valley voltage of the drain-source voltage of the freewheeling circuit according to sample signal Vsen. Enabling circuit 52 can generate enabling signal EN with a first active level length (e.g., the first time interval) according to track signal Vtr representing the time interval passed in the switching cycle of the main power switch. For example, enabling circuit 52 can generate track signal Vtr by sampling the voltage across the secondary winding. Then, track signal Vtr may be compared against a threshold signal to generate enabling signal EN. In this example, the moment when track signal Vtr reaches the threshold signal is the "first moment," and the enabling signal EN may be active at the first moment. Here, enabling signal EN can become active after the secondary current decreases to zero, and may become inactive after the end of the second time interval, thereby controlling the freewheeling circuit to remain on in the second time interval while enabling signal EN is active. The time interval during which enabling signal EN is active is the enabling time interval, which may be set according to the type of the switching converter and operation principles, in order to guarantee that the enabling time interval is greater than the second time interval.

Control circuit 10 can also include freewheeling control circuit 53 that can receive input voltage Vin, output voltage Vout, detection signal Vs, and enabling signal EN, and may generate control signal V1. For example, freewheeling control circuit 53 can control the freewheeling circuit to be turned on when detection signal Vs and enabling signal EN are active, and remain on in the second time interval. That is, control signal V1 may be active when the valley of the drain-source voltage of the freewheeling circuit arrives during the enabling time interval. Moreover, the active time of control signal V1 (e.g., the second time interval) can be adjusted according to input voltage Vin and output voltage Vout.

Control circuit 10 can also include rectifying control circuit 54 and driving circuit 55. For example, rectifying control circuit 54 can generate control signal V2, and driving circuit 55 can generate freewheeling control signal $V_{GSR}$. After the main power switch is turned off, control signal V2 may be active and then the freewheeling circuit can be turned on. After the secondary current decreases to zero (e.g., the first time interval ends), control signal V2 may be inactive, and then the freewheeling circuit can be turned off. When enabling signal EN is active and detection signal Vs is detected to be active, driving control signal V1 may be active to control the freewheeling circuit to be turned on. While the second time interval reaches at a predetermined time or the secondary current reaches the current reference, driving control signal V1 may be inactive and then the freewheeling circuit can be turned off.

Referring back to FIG. 3 again, when the freewheeling circuit includes freewheeling power switches Qs1 and Qs2, driving circuit 55 can generate freewheeling control signals $V_{GSR1}$ and $V_{GSR2}$ according to control signals V1 and V2. When control signal V2 is active, driving circuit 55 can generate freewheeling control signals $V_{GSR1}$ and $V_{GSR2}$ to control freewheeling power switches Qs1 and Qs2 to be turned on. After the first time interval, control signal V2 may be inactive to control freewheeling power switches Qs1 and Qs2 to be turned off. When control signal V1 is active, driving circuit 55 can generate control signal $V_{GSR2}$ to control freewheeling power switch Qs2 to be turned on and after the second time interval, and control signal V1 can be inactive to control freewheeling power switch Qs2 to be turned off.

Figure 6:
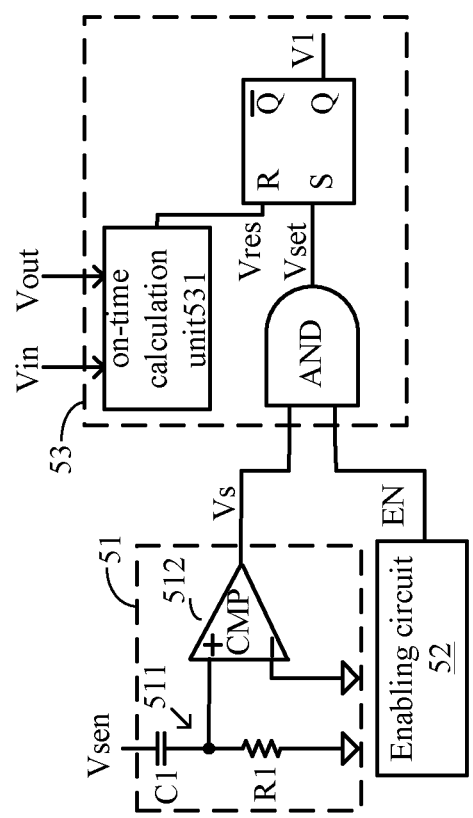
FIG. 6 is a schematic block diagram of a second example control circuit, in accordance with embodiments of the present invention.

Referring now to FIG. 6, shown is a schematic block diagram of a second example control circuit, in accordance with embodiments of the present invention. In particular embodiments, control circuit 10 can include detection circuit 51 and enabling circuit 52. For example, detection circuit 51 can include filter circuit 511 and comparator 512. Filter circuit 511 can receive and filter sampling signal Vsen. A first input terminal of comparator 512 may receive sampling signal Vsen after filtering, and a second input terminal of comparator 512 may receive a reference signal. The reference signal can be set to be zero or near zero, such that the resonant valley of the drain-source voltage of the freewheeling circuit can be detected. For example, the reference signal can be the secondary ground. When sampling signal Vsen after filtering reaches the reference signal, comparator 512 may activate detection signal Vs (e.g., as a single pulse signal).

In particular embodiments, filter circuit 511 can include capacitor C1 and resistor R1 connected in series to filtering sampling signal Vsen. Further, detection circuit 51 can include a single pulse generation circuit (e.g., connected with the output terminal of comparator 512) to generate the detection signal with a fixed pulse width. It should be understood that other circuits which can realize the same functionality can alternatively be utilized in certain embodiments. Control circuit 10 can also include freewheeling control circuit 53, which may include on-time calculation unit 531 and a logic circuit. For example, on-time calculation unit 531 can generate reset signal Vres according to input voltage Vin and output voltage Vout to determine a length of the second time interval. The logic circuit can receive detection signal Vs and enabling signal EN, and may generate control signal V1 when detection signal Vs and enabling signal EN are active, in order to determine a beginning of the second time interval. For example, the logic circuit can include an AND-gate and a RS trigger or flip-flop. For example, the input terminals of the AND-gate can receive detection signal Vs and enabling signal EN, and the output terminal of the AND-gate may generate set signal Vset.

The set and reset terminals of the RS trigger can respectively receive set signal Vset and reset signal Vres, while the output terminal of the RS trigger may generate control signal V1. For example, on-time calculation unit 531 can include a count circuit that generates a time length that is increased with input voltage Vin of the switching converter and decreased with output voltage Vout of the switching converter, thereby controlling the length of time interval T2 under a COT (constant on time) mode. Further, on-time calculation unit 531 can include a comparison circuit that can compare a current sample signal representing secondary current Is flowing through the freewheeling circuit against a peak current reference under a peak current control mode. Further, when secondary current "Is" is greater than the peak current reference, the freewheeling circuit may be turned off, thereby realizing the adjustment of the length of time interval T2 (e.g., the length of control signal V1). For example, time interval T2 can be set around time period t2, e.g., between t2−th1 and t2+th2. Here, th1 and th2 are time thresholds. Moreover, th1 can be equal to or not equal to th2. Further, time period t2 can be set according to the type and operation principle of the switching converter, such that the drain-source voltage of the main power switch can drop to zero before the main power switch is turned on.

Taking the flyback converter as an example, when the control circuit operates under the COT (constant on time) mode, time period t2 can be expressed by the following formula (1).

$$t2 = K1\sqrt{\frac{Vin^2 - (N \cdot Vout)^2}{(N \cdot Vout)^2}} \quad (1)$$

In the formula above, K1 is a positive proportional parameter that is related to the equivalent inductance of the transformer and the junction capacitor between the freewheeling circuit and the secondary ground, N is the ratio of the transformer, Vin is the input voltage of the switching converter, and Vout is the output voltage of the switching converter. In particular embodiments, time interval T2 can be set by formula (1) directly. For example, time interval T2 can be slightly greater than or less than t2, which may be adjusted by time thresholds th1 and th2. When the control circuit operates under the peak current control mode, on-time calculation unit 531 can calculate peak current reference $V_{PK}$. Here, peak current reference $V_{PK}$ can be expressed by the following formula (2).

$$V_{PK} = K2\sqrt{Vin^2 - (NVout)^2} \quad (2)$$

In the formula above, K2 is a positive proportional parameter that is related to the equivalent inductance of the transformer and the junction capacitor between the freewheeling circuit and the secondary ground, N is the ratio of the transformer, Vin is the input voltage of the switching converter, and Vout is the output voltage of the switching converter. In particular embodiments, peak current reference $V_{PK}$ can be set by formula (2). In addition, freewheeling control circuit 53 can compare the current sample signal that represents the current flowing through the freewheeling circuit against peak current reference $V_{PK}$, thereby adjusting the second time interval (e.g., the active length of control signal V1). In some cases, the peak current reference can be set near peak current reference $V_{PK}$, such that time interval T2 can be adjusted within the predetermined range (t2−th1, t2+th2). In one example, the current sample signal can be obtained by detecting the drain-source voltage of the freewheeling power switch. That is, the drain-source voltage of the freewheeling circuit can be compared against the peak current reference to adjust time interval T2. Here, peak current reference $V_{PK}$ may represent output voltage Vout.

Figure 7:
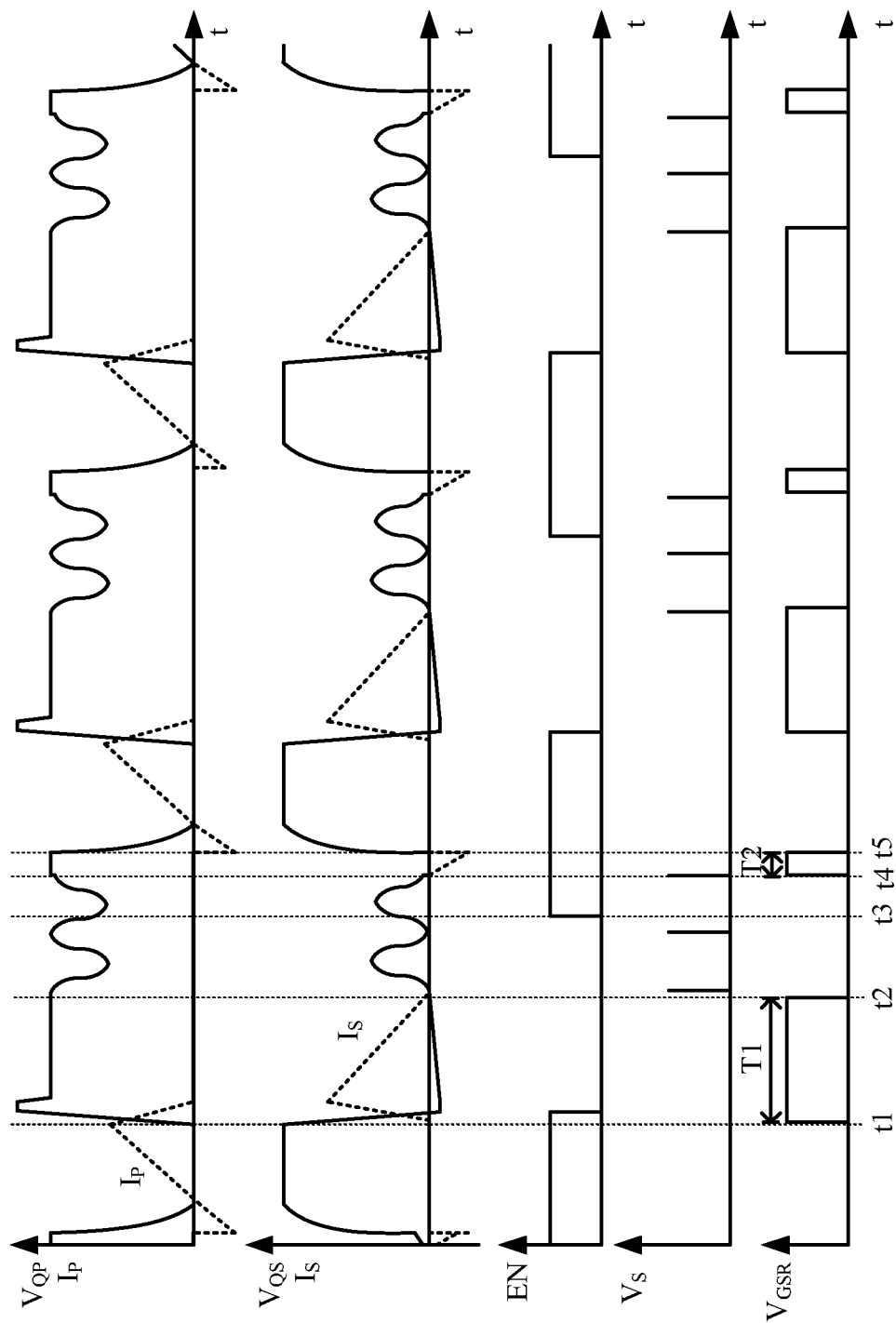
FIG. 7 is a waveform diagram of first example operation of the switching converter, in accordance with embodiments of the present invention.

Referring now to FIG. 7, shown is a waveform diagram of a first example operation of the switching converter, in accordance with embodiments of the present invention. In this particular example, the control circuit operates under the COT mode. At time t1, main power switch Qp switches from the on state to the off state, and freewheeling control signal $V_{GSR}$ switches from the inactive state to the active state, thereby controlling freewheeling power switch Qs to be turned on during time interval T1. During the time period that main power switch Qp is gradually turned off and freewheeling power switch Qs is gradually turned on, primary current Ip continues to decrease to zero, drain-source voltage Vop of main power switch Qp gradually increases, secondary current Is gradually increases, and drain-source voltage $V_Q$s of freewheeling power switch Qs gradually decreases. When main power switch Qp has been completely turned off and freewheeling power switch Qs has been completely turned on, secondary current Is begins to decrease.

At time t2, secondary current Is has been decreased to zero. After time t2, the detection circuit can begin to operate, and may generate detection signal Vs at each valley of the drain-source voltage of the freewheeling power switch. Since enabling signal EN is inactive, freewheeling control signal $V_{GSR}$ may remain inactive. At time t3, enabling signal EN can become active since the track signal reaches the threshold signal. At time t4, detection signal Vs is active, freewheeling control signal $V_{GSR}$ becomes active, and then freewheeling power switch Qs can be turned on. After time t4, freewheeling power switch Qs may be controlled to turned on time interval T2. Further, secondary current Is may increase reversely. After time interval T2, freewheeling power switch Qs can be turned off at time t5, and then primary current Ip decreases reversely, thereby accelerating the discharge of the junction capacitor of main power switch Qp, such that the drain-source voltage of main power switch Qp can be decreased to zero (or near zero) due to the resonance between the leakage inductor and the junction capacitor. In such a case, when main power switch is turned on, the drain-source voltage approaches zero, and thus zero-voltage-switching can be realized and the turn-on loss can be reduced. While in this example enabling signal EN becomes inactive when main power switch Qp is turned off again, enabling signal EN may only need to become inactive after time interval T2 in some cases.

Figure 8:
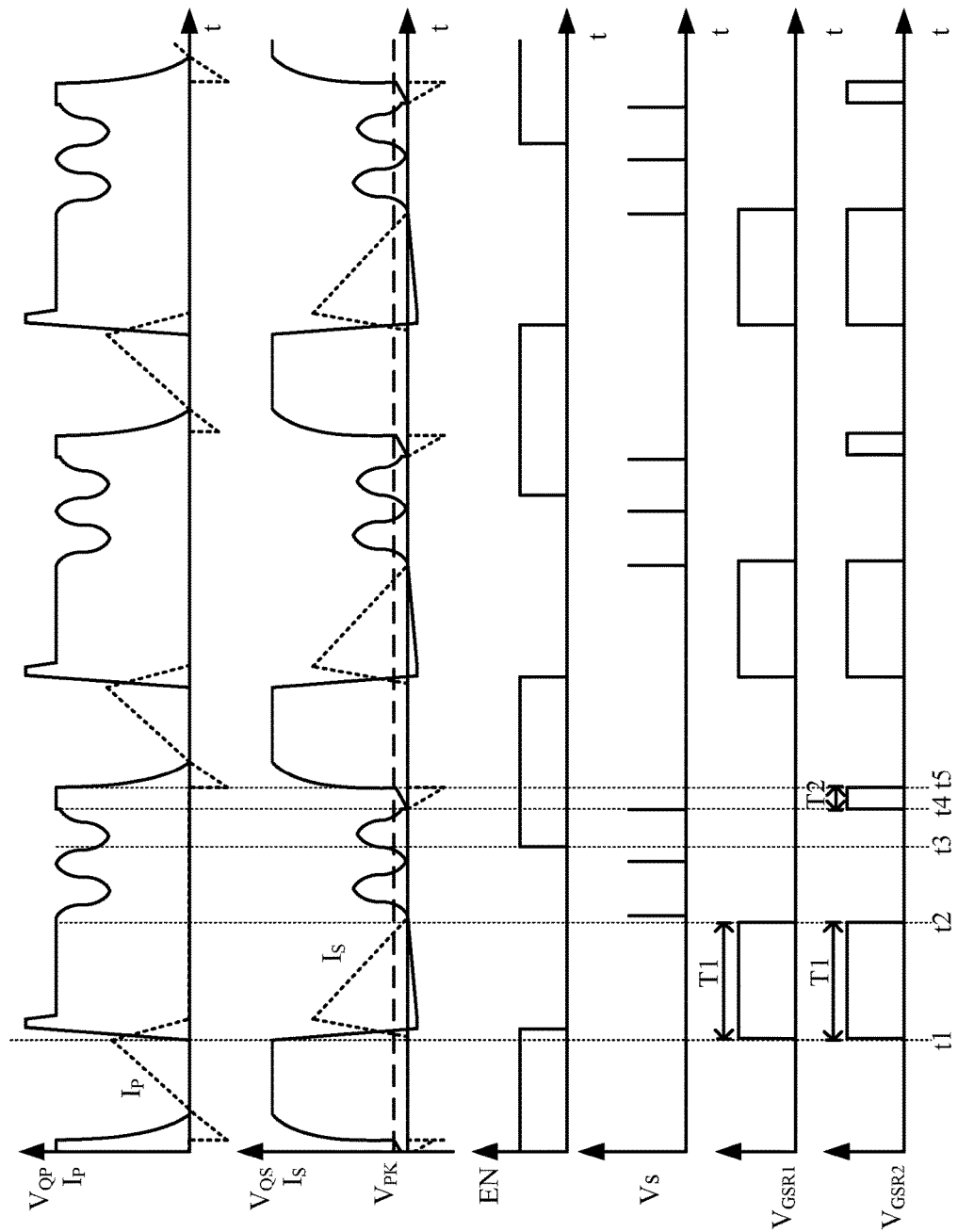
FIG. 8 is a waveform diagram of second example operation of the switching converter, in accordance with embodiments of the present invention.

Referring now to FIG. 8, shown is a second example operation of the switching converter, in accordance with embodiments of the present invention. In this particular example, the control circuit operates under a peak current control mode, and the on time calculation unit generates peak current reference $V_{PK}$. Referring also to FIG. 3, the freewheeling power switches can include freewheeling power switches Qs1 and Qs2. Further, the control circuit may generate freewheeling control signals $V_{GSR1}$ and $V_{GSR2}$ to respectively control the on and off states of freewheeling power switches Qs1 and Qs2. As shown in FIG. 8, at time t1, main power switch Qp switches from the on state to the off state and freewheeling control signals $V_{GSR1}$ and $V_{GSR2}$ become active, thereby controlling freewheeling power switches Qs1 and Qs2 to be turned on in time interval T1. During the time period that main power switch Qp is gradually turned off and freewheeling power switches Qs1 and Qs2 are gradually turned on, primary current Ip can continue to decrease to zero, and drain-source voltage Vop of main power switch Qp may gradually increase, while secondary current Is gradually increases and drain-source voltage $V_Q$s of freewheeling power switches Qs1 and Qs2 gradually decreases.

When main power switch Qp has been completely turned off and power switches Qs1 and Qs2 have been completely turned on, secondary current Is may begin to decrease. At time t2, secondary current Is has been decreased to zero. After time t2, the detection circuit can begin to operate and may generate detection signal Vs at each valley of the drain-source voltage of freewheeling power switch Qs2. Since enabling signal EN is inactive, freewheeling control signal $V_{GSR2}$ may remain inactive. At time t3, enabling signal EN can be activated since the track signal reaches the threshold signal. At time t4, detection signal Vs may be active, freewheeling control signal $V_{GSR2}$ can be activated, and then power switch Qs2 can be turned on. After time t4, power switch Qs2 can be turned on for time interval T2. Further, secondary current Is can increase reversely. After time interval T2, freewheeling power switch Qs2 may be turned off at time t5, and then primary current Ip can decrease reversely, thereby accelerating the discharge of the junction capacitor of main power switch Qp, such that the drain-source voltage of main power switch Qp can be decreased to zero (or near zero) due to the resonance between the leakage inductor and the junction capacitor. In such a case, when main power switch is turned on, the drain-source voltage approaches zero, and thus zero-voltage-switching can be realized and the turn-on loss can be reduced.

In particular embodiments, the freewheeling circuit can be controlled to be turned on in the first time interval after the main power switch is turned off. After the first time interval, the freewheeling circuit can be controlled to be turned on at the first valley of the drain-source voltage of the freewheeling circuit and remain on during the second time interval, such that the junction capacitor of the main power switch may be discharged to zero before the main power switch is turned on. Thus, the turn-on loss of the main power switch and the freewheeling circuit is reduced and the efficiency of the system may accordingly be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching converter having a main power switch and a freewheeling circuit, wherein the control circuit is configured to:
   a) control the freewheeling circuit to be turned on in a first time interval after the main power switch is turned off;
   b) control the freewheeling circuit to be turned on in a second time interval after the first time interval, in order to reduce turn-on loss of the main power switch;
   c) wherein the first time interval and the second time interval do not overlap each other in a switching cycle; and
   d) wherein the second time interval starts after the current flowing through the freewheeling circuit decreases to zero, and ends before the main power switch is turned on.

2. The control circuit of claim 1, wherein the control circuit is further configured to control the freewheeling circuit to be turned on in the second time interval when a corresponding valley of the drain-source voltage of the freewheeling circuit is detected after the first time interval.

3. The control circuit of claim 2, wherein the control circuit is further configured to select the corresponding valley of the drain-source voltage of the freewheeling circuit in accordance with the length of the switching cycle.

4. The control circuit of claim 1, wherein the on time of the freewheeling circuit is controlled by a count circuit generating an on time determined in accordance with the input voltage and the output voltage.

5. The control circuit of claim 1, wherein the on time of the freewheeling circuit is controlled by a comparison circuit that compares a secondary current flowing through the freewheeling circuit against a current threshold.

6. The control circuit of claim 5, wherein the current threshold represents the output voltage.

7. The control circuit of claim 1, wherein the switching converter operates under a discontinuous current mode (DCM).

8. The control circuit of claim 1, wherein:
   a) the freewheeling circuit comprises a main power switch and an auxiliary power switch coupled in parallel; and
   b) the control circuit is configured to control both the main power switch and the auxiliary power switch to be on in the first time interval, and to control the main power switch to be off and the auxiliary power switch to be on in the second time interval.

9. The control circuit of claim 1, wherein a duration of the first time interval is greater than that of the second time interval.

10. The control circuit of claim 1, further comprising:
    a) a detection circuit configured to receive a sample signal representing the drain-source voltage of the freewheeling circuit, and to generate a detection signal representing that a valley voltage of the drain-source voltage of the freewheeling circuit is detected;
    b) an enabling circuit configured to generate an enabling signal after the first time interval and before the main power switch is turned on in a next switching period; and
    c) a freewheeling control circuit configured to control the freewheeling circuit to be turned on when both the detection signal and the enabling signal are active to select a corresponding valley moment.

11. The control circuit of claim 10, wherein the freewheeling control circuit comprises:
    a) an on-time calculation circuit configured to determine a length of the second time interval; and
    b) a logic circuit configured to determine a beginning of the second time interval when both detection signal and the enabling signal are active.

12. The control circuit of claim 11, wherein the on-time calculation circuit comprises a count circuit having a time length increased with the input voltage of the switching converter and decreased with the output voltage of the switching converter.

13. The control circuit of claim 11, wherein:
    a) the on-time calculation circuit comprises a comparison circuit configured to compare a secondary current flowing through the freewheeling circuit against a current threshold; and
    b) the freewheeling circuit is turned off when the secondary current is greater than the current threshold.

14. A control circuit for a switching converter having a main power switch and a freewheeling circuit, wherein the control circuit is configured to:
    a) control the freewheeling circuit to be turned on in a first time interval after the main power switch is turned off;
    b) control the freewheeling circuit to be turned on in a second time interval after the first time interval, in order to reduce turn-on loss of the main power switch, wherein the first time interval and the second time interval do not overlap each other in a switching cycle; and
    c) adjust a length of the second time interval according to information of an input voltage and an output voltage of the switching converter.

15. The control circuit of claim 14, wherein the adjustment of the length of the second time interval has a same change trend as that of the input voltage of the switching converter, and has an opposite change trend as that of the output voltage of the switching converter.

16. The control circuit of claim 14, wherein the length of the second time interval is adjusted to make a drain-source voltage of the main power switch decrease to be a threshold after the second time interval ends and before the main power switch is turned on.

17. The control circuit of claim 16, wherein the control circuit is further configured to control the main power switch to be turned on when the drain-source voltage of the main power switch is decreased to the threshold.

18. A control circuit for a switching converter having a main power switch and a freewheeling circuit, wherein the control circuit is configured to:
    a) control the freewheeling circuit to be turned on in a first time interval after the main power switch is turned off;
    b) control the freewheeling circuit to be turned on in a second time interval after the first time interval, in order to reduce turn-on loss of the main power switch, wherein the first time interval and the second time interval do not overlap each other in a switching cycle; and
    c) control the freewheeling circuit to be turned on in the second time interval according to a time interval passed in the current switching cycle of the main power switch.

19. The control circuit of claim 18, wherein the main power switch is controlled to be turned on after a first moment when the time interval passed in the current switching cycle of the main power switch reaches a threshold signal.

* * * * *